US 8,588,815 B2

(12) United States Patent
Kenyon

(10) Patent No.: US 8,588,815 B2
(45) Date of Patent: Nov. 19, 2013

(54) CUSTOM INFORMATION FOR WIRELESS SUBSCRIBERS BASED ON PROXIMITY

(75) Inventor: Jeffrey D. Kenyon, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 1193 days.

(21) Appl. No.: 10/940,259

(22) Filed: Sep. 13, 2004

(65) Prior Publication Data

US 2006/0058037 A1  Mar. 16, 2006

(51) Int. Cl.
*H04W 24/00* (2009.01)

(52) U.S. Cl.
USPC .................. 455/456.3; 455/456.1; 455/456.5

(58) Field of Classification Search
USPC .......... 455/456.3, 408, 414.1, 456.1, 459, 41, 455/466, 404.2, 456.5, 434; 705/26, 500, 705/14.41, 23, 26.1; 701/410
See application file for complete search history.

(56) References Cited

U.S. PATENT DOCUMENTS

| 6,937,998 B1* | 8/2005 | Swartz et al. .................... 705/26 |
| 7,103,368 B2* | 9/2006 | Teshima ..................... 455/456.3 |
| 2002/0055877 A1* | 5/2002 | Ariga et al. ..................... 705/14 |
| 2002/0077062 A1* | 6/2002 | An et al. ......................... 455/41 |
| 2003/0003929 A1* | 1/2003 | Himmel et al. ............... 455/466 |
| 2003/0060214 A1* | 3/2003 | Hendrey et al. .............. 455/456 |
| 2003/0190921 A1* | 10/2003 | Stewart ..................... 455/456.3 |
| 2004/0038665 A1* | 2/2004 | Hosono ...................... 455/404.2 |
| 2004/0266457 A1* | 12/2004 | Dupray ...................... 455/456.5 |

\* cited by examiner

*Primary Examiner* — Kiet Doan
(74) *Attorney, Agent, or Firm* — Swanson & Bratschun, L.L.C.

(57) ABSTRACT

A method of delivering location-specific information to a wireless subscriber includes receiving one or more rules from an information distribution entity. The one or more rules define a geographic area related to the information distribution entity and define information to be distributed to the wireless subscriber when a wireless device of the wireless subscriber is in the geographic area. The method also includes receiving a registration message from the wireless subscriber, determining that the wireless device of the subscriber is in the geographic area, and delivering the information to the wireless device of the wireless subscriber.

16 Claims, 2 Drawing Sheets

US 8,588,815 B2

CUSTOM INFORMATION FOR WIRELESS SUBSCRIBERS BASED ON PROXIMITY

BACKGROUND OF THE INVENTION

Embodiments of the invention relate generally to wireless networks. More specifically, embodiments relate to systems and methods for distributing geographically-specific information to wireless customers.

With the advent of GPS chipsets and other location-monitoring technology in wireless devices, opportunities emerge for leveraging geographic information to deliver tailored information to subscribers. Efforts to date, however, appear to focus on businesses simply "spraying" passing users indiscriminately. This wastes bandwidth and risks annoying customers among other things. Thus, opportunities for improvements exist.

BRIEF SUMMARY OF THE INVENTION

Embodiments of the invention provide a method of delivering location-specific information to a wireless subscriber. The method includes receiving one or more rules from an information distribution entity. The one or more rules define a geographic area related to the information distribution entity and define information to be distributed to the wireless subscriber when a wireless device of the wireless subscriber is in the geographic area. The method also includes receiving a registration message from the wireless subscriber, determining that the wireless device of the subscriber is in the geographic area, and delivering the information to the wireless device of the wireless subscriber.

In some embodiments, the information distribution entity may be a business, a point-of-interest, an event planner, a museum, a tour operator, a park service, an employer, a public transportation facility operator, and/or the like. The wireless device may be a cellular telephone, personal digital assistant, pager, text messaging device, personal computer, two-way radio, and/or the like. The information may be a short text message, pre-recorded voice message, graphic image, audio visual message, and/or the like. Receiving a registration message from the wireless subscriber may include a wireless transmission from the wireless device of the subscriber. Receiving a registration message from the wireless subscriber alternatively or additionally may include receiving a message via the Internet. Determining that the subscriber is in the geographic area may include interrogating the wireless device to return its location. Determining that the subscriber is in the geographic area may include receiving a periodic broadcast from the wireless device that includes the device's location. At least one rule may include a specification of a duration that the wireless device must remain in the geographic area after which duration the information is delivered. At least one rule may include a specification of a frequency for delivering the information. Receiving one or more rules from an information distribution entity may include receiving a selection of a predefined rule.

Other embodiments provide a system for delivering location-specific information to a wireless subscriber. The system includes a host computer and a computer-readable medium having computer-executable instructions for programming the host computer. The instructions include instructions for programming the host computer system to receive one or more rules from an information distribution entity, receive a registration message from the wireless subscriber, determine that the wireless device of the subscriber is in a specific geographic area, and deliver the information to the wireless device of the wireless subscriber. The one or more rules define the geographic area related to the information distribution entity and define information to be distributed to the wireless subscriber when the wireless device of the wireless subscriber is in the geographic area.

In still other embodiments, a system for delivering location-specific information to a wireless subscriber includes means for receiving one or more rules from an information distribution entity, means for receiving a registration message from the wireless subscriber, means for determining that a wireless device of the subscriber is in a specific geographic area, and means for delivering the information to the wireless device of the wireless subscriber. The one or more rules define the specific geographic area related to the information distribution entity and define information to be distributed to the wireless subscriber when the wireless device of the wireless subscriber is in the geographic area.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
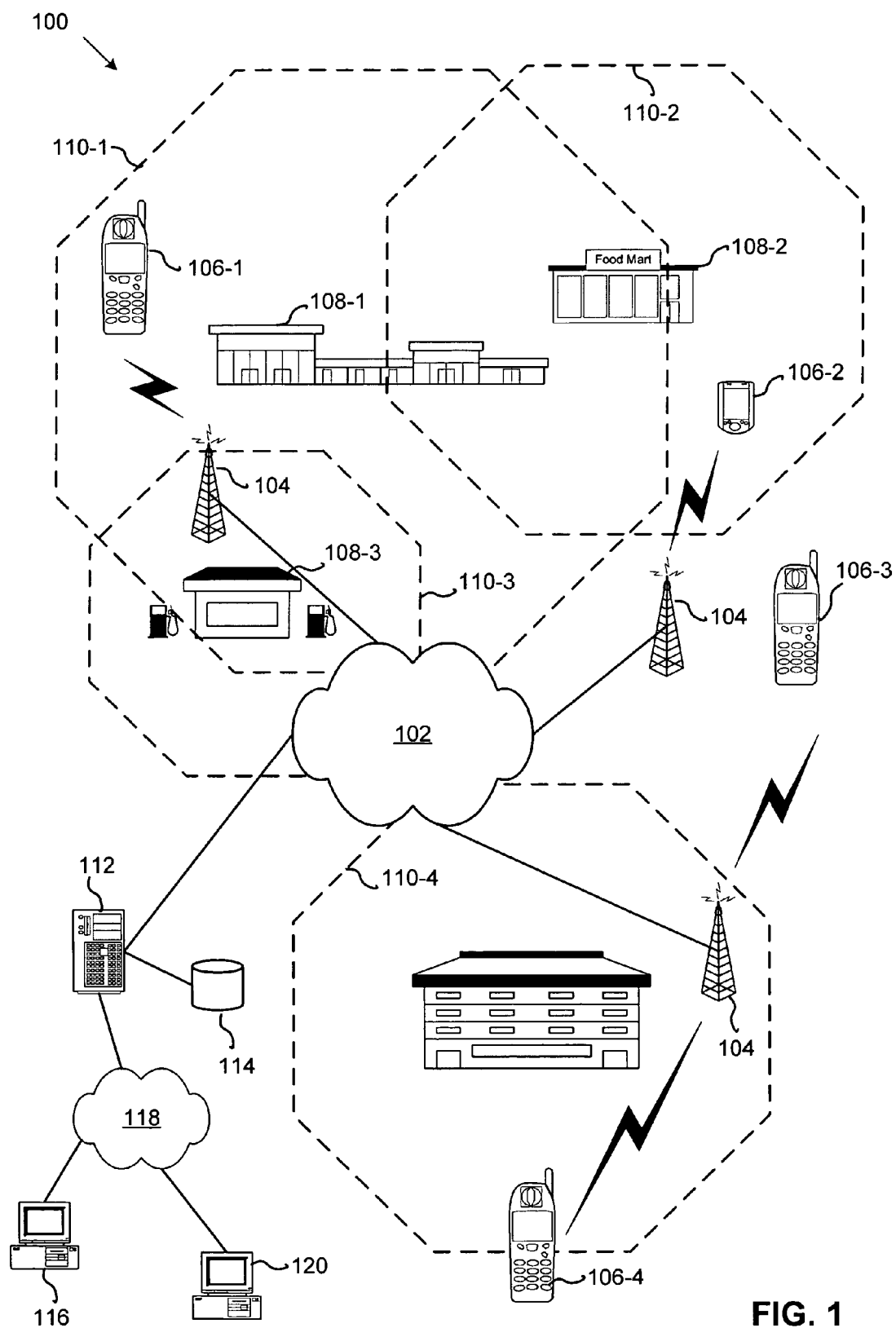
FIG. 1 illustrates a system for providing custom information to wireless subscribes based on proximity.

Embodiments of the present invention relate to systems and methods for providing geographically-specific information to wireless subscribers on demand. Embodiments of the invention will be described generally with respect to two scenarios: a "temporary" scenario and a "permanent" scenario. It should be understood that the terms "temporary" and "permanent" are not being used literally, as will be appreciated by those skilled in the art in light of this disclosure. In the temporary scenario, a user is interested in a given type of information for a limited period of time. In the permanent scenario, the business and a wireless subscriber have a longer term relationship.

In an example of the temporary scenario, a wireless subscriber enters an unfamiliar shopping mall and sees a sign at the entrance that alerts the subscriber that, "This mall is wireless-enabled! For special deals and information, dial *SHOP on your wireless device." The subscriber does so, thereby registering his wireless device. The service provider, which may be the subscriber's wireless service provider, an independent service provider, or the like, determines or receives the geographic location of the wireless device and compares it to business-specific information stored on a server. When the wireless device (and presumably the subscriber) enters a specific area, some bit of pre-defined content is delivered. For example, if the subscriber enters a pre-defined area surrounding a specific restaurant, a text message (e.g., an SMS message) may be delivered to the wireless device saying, for example, "Show this message to the hostess for a 20% discount at . . . " then lists the restaurant. Such messages continue to be delivered to the wireless device as the subscriber enters other pre-defined areas in the vicinity of the shopping mall. When the subscriber leaves the vicinity of the shopping mall, the system permanently un-registers the subscriber from the service, at least for that particular session. If the subscriber ever returned to the mall, they would need to re-dial *SHOP to re-register for that mall.

In an example of the permanent scenario, assume the subscriber shops at the same mall. Prior to visiting the mall, however, the subscriber accesses a web site, offered by, for example, the wireless provider, an independent provider, the mall, or a merchant at the mall, and selects categories of interests (e.g., eating out, movies, books, sporting goods), and/or specific information channels. The subscriber's selections are stored on a server, and the system monitors the subscriber's geographic location. In some embodiments, the subscriber's location is monitored continuously. In other embodiments the subscriber's location is monitored infrequently until the subscriber nears an area of interest, then with increasing frequency thereafter. Other examples are possible. When the subscriber's wireless device enters an area defined by a business, information is delivered. Thus, the subscriber might receive the same restaurant offer described above (assuming the subscriber registered to receive restaurant offers generally, and/or offers from the specific restaurant), but would not receive offers from merchants outside the subscriber's specific areas of interest.

Merchants and other information distributors could define rules that specify the information to be delivered (e.g., offers, general advertisements, contests, and the like), the format of the information (e.g., text message, image or full motion video, voice message delivered as a phone call, email, and the like), the size of the geographic area surrounding their specific establishment, the shopping district, entertainment area, or the like within which the establishment is located, the duration that the subscriber must remain in the area before delivery of the information, the frequency of delivery, and the like.

The number of areas that an information distributor may define may be limited, based on the precision within which the wireless device's location may be determined. For example, if a wireless system is able to place a user only within 100 meters of a given location, the type of information to be delivered may not be the same as that delivered if the subscriber can be located to within 5 meters.

Information formats may include SMS message, a pre-recorded voice message, a graphic image, or any other content type. The type of information delivered is limited only by the limitations of the wireless device receiving the information. For example, a user of a low-end cell phone may be limited to receiving text messages, while a user with a portable computer may be able to receive an MPEG with audio and full motion video.

Individual businesses may be responsible for defining the regions surrounding their location and the content to be delivered. Content may be static (e.g., send the text or an image file stored on a service provider's server) or dynamic (e.g., return to the user the content returned by a web service call to the merchant's server). Content could be changed monthly, weekly, hourly, or on any other interval.

As will be described in more detail hereinafter, the method by which the subscriber's location is determined may be dependent upon the network type. In some examples, the wireless device broadcasts its location; in others, the device is interrogated to return its location. In some embodiments, the location of the wireless device is determined by the wireless system with reference to network access points or other reference points having a known location.

Having described embodiments of the invention generally, attention is directed to FIG. 1, which illustrates a system 100 for distributing custom information to wireless customers according to embodiments of the invention. It should be appreciated that the system 100 is merely exemplary of a number of possible embodiments according to the invention, as is apparent to those skilled in the art in light of this description.

The system 100 includes a wireless network 102 and access points 104. The wireless network 102 may be any wireless network or combination of networks, such as a cellular telephone network, a satellite-based network, a pager network, and the like, some of which do not include land-based access points 104. Via the network 102, wireless devices 106 are able to receive and/or send information such as voice, data, graphics, text messages, and the like. The wireless devices 106 may cellular phones, pagers, personal digital assistants (PDAs), personal computers, and the like.

In some embodiments, the wireless devices 106 include location sensing devices that provide the geographic location of the device. Such location sensing devices include Global Positioning System (GPS) chipsets and the like that use external references to determine the device's location. In some embodiments, the location of a wireless device 106 may be determined with reference to, for example, a land-based access point. Those skilled in the art will appreciate that any of a large variety of systems and methods may be used to determine the geographic location of a wireless device, including locator devices affixed to or located near merchant locations, which devices are specifically designed to identify wireless devices in their proximity.

A number of information distribution entities 108 are located within the range of the system 100. The information distribution entities 108 may be retail merchants, service providers, public transportation facilities, points of interest, employer locations, and the like. Essentially any entity that wishes to distribute information based on the proximity of a wireless subscriber to a specific location may be an information distribution entity 108. Further, information distribution entities 108 may change location.

Associated with each information distribution entity 108 is a distribution zone 110. For ease of illustration, the distribution zones 110 are shown as regular polygons centered on an associated information distribution entity 108. This is not a requirement, however. The zones 110 may be irregular shapes and need not include the entity. Further multiple zones may overlap as shown.

As will be described in more detail hereinafter, a wireless customer, having a wireless device 106, that enters a zone 110 may receive custom information based on his location. The wireless customer may register to receive the information upon entering or approaching the zone or may pre-register for the information. The information may alert the customer to sales, contests, coupons, event-specific information, and/or any information that the information distribution entity wishes to distribute that aligns with selections of the subscriber.

In one scenario, a wireless subscriber temporarily registers to receive information. This may occur, for example, when the subscriber enters or nears a particular zone 110 and causes a signal to be sent from the subscriber's wireless device through the network 102, via an access point 104, to a server 112. The server receives the registration and stores associated information on a storage arrangement 114 associated with the server 112. Thereafter, the location of the wireless device 106 is monitored. When the subscriber is located within a specific zone 110, information related to the entity 108 within the zone 110 is delivered to the wireless device 106.

In another scenario, the subscriber permanently registers to receive information in specific interest categories, from specific merchants, from specific shopping or entertainment districts, and/or the like. The subscriber may do so using his wireless device, via the network, and without respect to his present geographic location. In other embodiments, the subscriber uses a computing device 116 to access the server 112 via a network 118, which may be, for example, the Internet. Thus, for example, in ways known to those skilled in the art, the subscriber uses web pages of the merchant, the wireless service provider, or the like, to select categories of interest, specific merchants, specific events, that define the information that the subscriber will receive when in predefined geographic areas.

Information distribution entities 108 may define the information to be delivered in a number of ways. In one example, the information distribution entity uses a computing device 120 to access, via the network 118, the server 112, or other server associated with the wireless service provider or other appropriate entity. The entity may select predefined rules and/or create custom rules in ways known to those skilled in the art.

Figure 2:
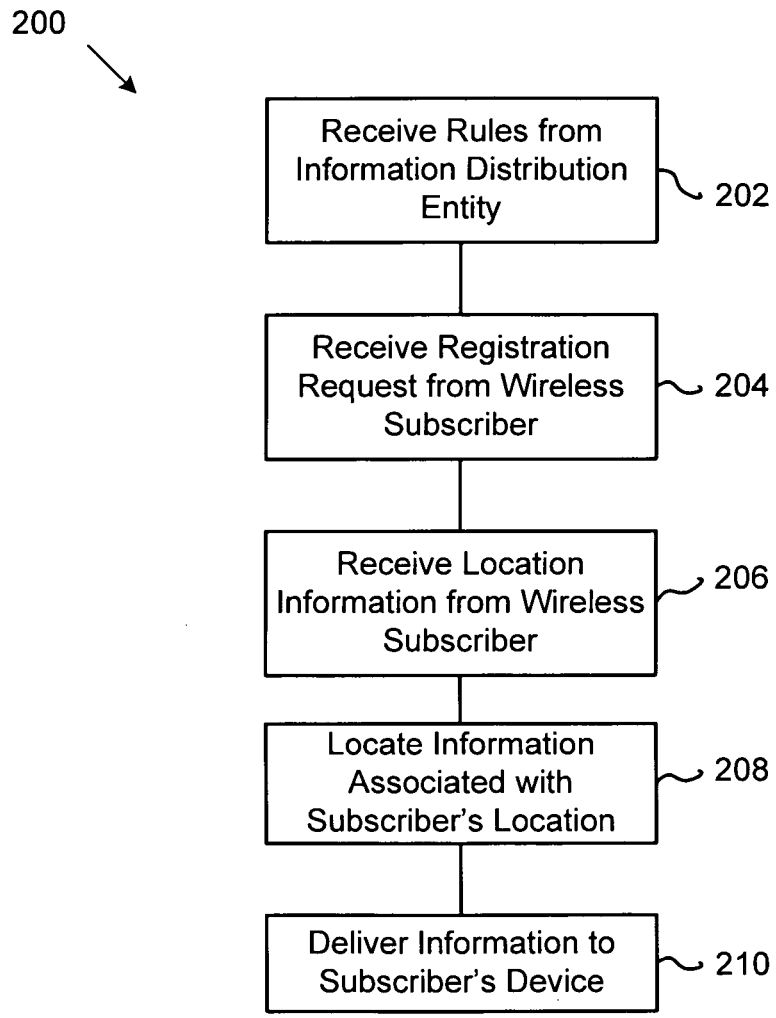
FIG. 2 illustrates a method of providing custom information to wireless subscribes, which method may be embodied in the system of FIG. 1.

Having described an exemplary information delivery system 100 according to embodiments of the invention, attention is directed to FIG. 2, which illustrates a method 200 of delivering custom information to wireless subscribers according to embodiments of the invention. The method 200 may be implemented in the system 100 of FIG. 1 or other appropriate system. It is to be understood that other embodiments of method according to the invention may have more, fewer, or different steps than those illustrated here. Further, other embodiments may traverse the steps in different orders than that illustrated here.

The method 200 begins at block 202 at which point an information distribution entity, which may be any information distribution entity identified herein, including those illustrated and discussed with respect to FIG. 1, defines rules for distributing information to wireless subscribers. As previously described, the rules may include the type of information, the format of the information, the frequency of delivery, the geographic area within which the subscriber is to be located before the information is delivered, the length of time the subscriber should be in the area before the information is delivered, and/or the like. Information distribution entities may select pre-defined rules or create rules of their own. Information distribution entities may access a web server, via the Internet, for example, to define and/or select rules.

At block 204, a wireless subscriber registers to receive information. The registration request may be via a wireless network or other network. The registration request may be for "temporary" registration or "permanent" registration as previously described. The subscriber may select specific information distribution entities from whom to receive information, categories of information, and/or geographic areas within which to receive information. Many other examples are possible and apparent to those skilled in the art in light of this disclosure.

At block 206, the location of the wireless subscriber (i.e., the wireless subscriber's wireless device) is determined. This may be by way of a location monitoring device, such as a GPS chipset associated with the wireless device, or by way of location monitoring devices external to the wireless device. The location may be determined on a periodic schedule, upon interrogation, upon the location changing, or in other ways known to those skilled in the art.

When the location of a wireless device coincides with a geographic location in which the associated subscribed has requested to receive information, the associated information is located at block 208. This may be accomplished, for example, using well known database structures and commands and/or the like. Those skilled in the art will appreciate many different methods for locating the information based on the subscriber's location.

At block 210, the information is delivered to the wireless subscriber's device. The information may be in format capable of being delivered by the wireless network, including those formats described herein, and may include any conceivable content, including the content specifically described herein.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers and other hardware into networks and enable communication among them. Further, while embodiments of the invention have been described in terms of businesses, it may also be used by museums or historic districts (to provide tour or landmark information), event planners (to disseminate information or late notices to those attending events), employers (to distribute specific internal information to their employees in a given area, such as a weather alert, building outage, etc), or any number of other applications. Accordingly, the above description should not be taken as limiting the scope of the invention, which is defined in the following claims.

What is claimed is:

1. A method of delivering location-specific information to a wireless subscriber, comprising:
    at a host computer, receiving one or more rules from an information distribution entity, wherein the one or more rules define a geographic area related to the information distribution entity and define information to be distributed to the wireless subscriber when a wireless device of the wireless subscriber is in the geographic area;
    receiving, at a server, a subscriber-initiated registration message from the wireless subscriber, wherein the subscriber requests to receive information from a selected information distribution entity, wherein the subscriber-initiated registration message is sent by the wireless subscriber from a subscriber computing device other than the wireless device, the subscriber computing device being located outside the geographic area;
    determining that the wireless device of the subscriber is in the geographic area, wherein determining that the subscriber is in the geographic area comprises receiving a periodic broadcast from the wireless device that includes the device's location; and
    delivering the information to the wireless device of the wireless-subscriber, wherein at least one rule includes a specification of a duration that the wireless device must remain in the geographic area after which duration the information is delivered.

2. The method of claim 1, wherein the information distribution entity comprises a selection from the group consisting of business, point-of-interest, event planner, museum, tour operator, park service, employer, and public transportation facility operator.

3. The method of claim 1, wherein the wireless device comprises a selection from the group consisting of cellular telephone, personal digital assistant, pager, text messaging device, personal computer, and two-way radio.

4. The method of claim 1, wherein the information comprises a selection from the group consisting of short text message, pre-recorded voice message, graphic image, and audio visual message.

5. The method of claim 1, wherein receiving a registration message from the wireless subscriber comprises receiving a wireless transmission from the wireless device of the subscriber.

6. The method of claim 1, wherein receiving a registration message from the wireless subscriber comprises receiving a message via the Internet.

7. The method of claim 1, wherein determining that the subscriber is in the geographic area comprises interrogating the wireless device to return its location.

8. The method of claim 1, wherein at least one rule includes a specification of a frequency for delivering the information.

9. The method of claim 1, wherein the subscriber-initiated registration message is sent to the server prior to receiving any information from the selected information distribution entity.

10. A system for delivering location-specific information to a wireless subscriber, comprising:
  a host computer;
  a computer-readable medium having stored thereon computer-executable instructions for programming the host computer to:
    receive one or more rules from an information distribution entity, wherein the one or more rules define a geographic area related to the information distribution entity and define information to be distributed to the wireless subscriber when a wireless device of the wireless subscriber is in the geographic area, and wherein one of the one or more rules comprises a predefined rule;
    receive, at a server, a subscriber-initiated registration message from the wireless subscriber, wherein the subscriber requests to receive information from a selected information distribution entity, wherein the subscriber-initiated registration message is sent by the wireless subscriber from a subscriber computing device other than the wireless device, the subscriber computing device being located outside the geographic area;
    determine that the wireless device of the subscriber is in the geographic area, wherein determining that the subscriber is in the geographic area comprises receiving a periodic broadcast from the wireless device that includes the device's location; and
    deliver the information to the wireless device of the wireless subscriber, wherein at least one rule includes a specification of a duration that the wireless device must remain in the geographic area after which duration the information is delivered.

11. The system of claim 10, wherein the information distribution entity comprises a selection from the group consisting of business, point-of-interest, event planner, museum, tour operator, park service, employer, and public transportation facility operator.

12. The system of claim 10, wherein the wireless device comprises a selection from the group consisting of cellular telephone, personal digital assistant, pager, text messaging device, personal computer, and two-way radio.

13. The system of claim 10, wherein the information comprises a selection from the group consisting of short text message, pre-recorded voice message, graphic image, and audio visual message.

14. The system of claim 10, wherein at least one rule includes a specification of a frequency for delivering the information.

15. The system of claim 10, wherein the subscriber-initiated registration message is sent to the server prior to receiving any information from the selected information distribution entity.

16. A system for delivering location-specific information to a wireless subscriber, comprising:
  means for receiving one or more rules: from an information distribution entity, wherein the one or more rules define a geographic area related to the information distribution entity and define information to be distributed to the wireless subscriber when a wireless device of the wireless subscriber is in the geographic area, and wherein one of the one or more rules comprises a predefined rule;
  means for receiving, at a server, a subscriber-initiated registration message from the wireless subscriber, wherein the subscriber requests to receive information: from a selected information distribution entity, wherein the subscriber-initiated registration message is sent by the wireless subscriber from a subscriber computing device other than the wireless device, the subscriber computing device being located outside the geographic area;
  means for determining that the wireless device of the subscriber is in the geographic area, wherein determining that the subscriber is in the geographic area comprises receiving a periodic broadcast from the wireless device that includes the device's location; and
  means for delivering the information to the wireless device of the wireless subscriber, wherein at least one rule includes a specification of a duration that the wireless device must remain in the geographic area after which duration the information is delivered.

* * * * *